able.  The  temstainedtemperature  and  water  vapor  content  of  the  gas  stream  containing  $NO_2$  are  adjusted  by  conventional  methods  within  the  aforesaid  suitable  limits  and  the  gas  stream  is  then  contacted  with  finely  divided  sodium  carbonate.
United States Patent Office 3,498,743
Patented Mar. 3, 1970

3,498,743
METHOD FOR REMOVING $NO_2$ FROM WASTE GASES
David M. Kyllonen, Villanova, Pa., assignor to Mine Safety Appliances Company, a corporation of Pennsylvania
No Drawing. Filed May 17, 1966, Ser. No. 550,598
Int. Cl. B01d 53/12; C01b 21/36
U.S. Cl. 23—2          4 Claims

ABSTRACT OF THE DISCLOSURE

Nitrogen dioxide is removed from waste gases by maintaining the water vapor content of the waste gas above about 250 p.p.m. and the temperature between about ambient and 200° C. and contacting the waste gas with a bed of finely divided sodium carbonate, calcium carbonate or calcium oxide.

---

This invention relates to the removal of nitrogen dioxide from other gases, and more particularly to the removal of nitrogen dioxide from waste gas streams containing small amounts of nitrogen dioxide that are normally discharged to the atmosphere.

The removal of nitrogen dioxide from industrial and other waste gases to decrease air pollution is a problem of long standing that becomes of more critical importance as industrialization increases and there is more awareness of the dangers of air pollution. Special difficulties in treating waste gases arise because of the necessity to obtain substantial reaction or capture of a gas component that is present only in very low concentrations. For example, a typical nitric acid plant waste gas contains 2500 to 2700 parts per million, p.p.m., $NO_2$ (0.25–0.27 volume percent) and currently it is considered desirable to reduce the concentration to 500 (0.05 volume percent) or less before discharging it to the atmosphere. Waste gases generally contain less than about 10,000 p.p.m. $NO_2$. In normal chemical processing for the purpose of producing chemical products, the reactants used are present in high concentrations so the special difficulties of obtaining substantial reactions at low concentrations are not encountered. For example, the $NO_2$ in the waste gas from nitric acid plants is simply a loss encountered because the process for producing nitric acid cannot utilize the $NO_2$ below the concentration in the waste gas.

Conventionally, liquid scrubbing methods have been used in attempts to remove $NO_2$ from waste gases, but these have not proved satisfactory to substantially lower the $NO_2$ concentration. In a currently industrially used method, $NO_2$ and hydrocarbons are catalytically combusted; any oxygen in the waste gas stream must be consumed before any consumption of $NO_2$ can occur, which results in a large consumption of hydrocarbons. Further, the combustion products, which may contain other undesirable gases, are then discharged to the atmosphere.

It is well known that $NO_2$ can be reacted with alkaline materials, such as alkali and alkaline earth metal carbonates and oxides, to form nitrates and nitrites, but such reactions have heretofore not been applied to or considered suitable for waste gas treatment because of the need to obtain substantial seaction at low $NO_2$ concentrations.

This invention is based on my discovery that the $NO_2$ concentration in a gas stream can be reduced to an extremely low level by contacting the gas stream with solid sodium carbonate, calcium carbonate or calcium oxide under critical conditions of temperature and water vapor content. Suitably, the gas stream contains at least about 250 p.p.m. water vapor, preferably between about 1000 and 8000 p.p.m., and below that amount that causes agglomeration or tackiness of the solid reactant. The temperature is maintained between about ambient temperature and 200° C., preferably below about 120° C.

In the practice of this invention, the temperature and water vapor content of the gas stream containing $NO_2$ are adjusted by conventional methods within the aforesaid suitable limits and the gas stream is then contacted with finely divided sodium carbonate. Any conventional method of gas-solid contact may be used, such as for example, passing the gas through a fixed bed or fluidizing the solid reactant on the gas stream. Conveniently, the solid reactant may be introduced into a flowing gas stream and then be removed downstream of the point of introduction by a cyclone separator or other conventional gas-solid separators.

The nature of the effect of controlling water vapor content and temperature illustrated hereinafter in reference to the reaction of sodium carbonate can best be described in terms of the effectiveness of the reaction in reducing the concentration of the $NO_2$ and the efficiency of the reaction in utilizing the sodium carbonate. When the $NO_2$-containing gas stream contains less than about 250 p.p.m. water vapor there is an initial moderately effective reaction that becomes less effective with increasing temperature, but the sodium carbonate quickly becomes non-reactive after only about 1% or less of the sodium carbonate is reacted. When using more than about 250 p.p.m. water the effectiveness of the reaction is very substantially improved and the reaction remains very effective until about 15% or more of the sodium carbonate is utilized. The effectiveness of the reaction increases with increasing water content between about 250 and 1000 p.p.m. and becomes only slightly more effective by further increases in water concentration up to about 8000 p.p.m. At higher water concentrations, e.g., above about 10,000 p.p.m., the effectiveness rapidly decreases, due to agglomeration, tackiness or other physical modification of the sodium carbonate. The effectiveness of the reaction when using above about 250 p.p.m. water is not substantially changed between room temperature and 120° C., and decreases slightly with increasing temperature to about 200° C. Above about 200° C. the effectiveness of the reaction is substantially reduced and the presence or absence of water is of no noticeable effect.

In the following examples illustrative of this invention, a vertical three-foot section of three-inch diameter Pyrex pipe with suitable inlet and outlet connections was used as fluidized bed reactor. A sintered glass filter near the bottom of the pipe served as a distributor for the inlet gas stream and supported the charge of about one pound of powdered sodium carbonate. The effluent from the top of the reaction was continuously analyzed by an infrared spectrophotometer. When the gas flowed through the reactor, the sodium carbonate bed expanded and fluidized.

Illustrating the critical nature of the water content, a 0.53–0.55 c.f.m. room temperature nitrogen gas stream containing 2700 p.p.m. of $NO_2$ was flowed through the above described fluid bed reactor containing granular sodium carbonate. After a short while, all of the introduced $NO_2$ passed the reactor without absorption, then water vapor was added to the gas stream in stepwise increments, and the $NO_2$ concentration of the reactor effluent was measured. At 250 p.p.m. water the effluent contained 1600 p.p.m. $NO_2$; at 500 p.p.m. water, 1050 p.p.m. $NO_2$; at 700 p.p.m. water, 500 p.p.m. $NO_2$; and at 1000 p.p.m., 400 p.p.m. $NO_2$.

Illustrating the effect of temperature, a 0.53–0.54 c.f.m. nitrogen gas stream containing 2700 p.p.m. of $NO_2$ and 3200 p.p.m. water was reacted with sodium carbonate in the fluidized bed as in the previous example; the gas stream was gradually heated from room temperature to 200° C. and the $NO_2$ concentration in the effluent was measured. At temperatures between room temperature and 120° C., the effluent contained 100 p.p.m. $NO_2$ and as the temperature was further increased to 200° C., the concentration of $NO_2$ gradually increased to 700 p.p.m. In contrast, the effluent from the short-lived initial reaction of corresponding dry gas at 200° C. reduced the $NO_2$ concentration to only 1300 p.p.m.

In another example of this invention, a room temperature nitrogen stream containing 2700 p.p.m. $NO_2$ and 6200 p.p.m. of water was passed through the aforesaid fluidized bed reactor at a rate of 0.4 c.f.m. The $NO_2$ concentration was reduced to an average of 250 p.p.m. during a 32-hour period, and 19% of the sodium carbonate was reacted.

Illustrating a fixed bed reaction, a nitrogen gas stream containing 1000 p.p.m. $NO_2$ and 991 p.p.m. water was passed at room temperature at a rate of 0.65 c.f.m. through a 6-inch long packed bed of granular sodium carbonate held between glass wool plugs in a three-inch Pyrex pipe. The $NO_2$ concentration in the effluent from the bed ranged from 200 p.p.m. initially to 500 p.p.m., after 47 hours. Analysis of the bed chemical showed that 37% of the sodium carbonate had reacted.

For cleaning chemical plant effluents, fluidized bed reactions are especially desirable as they afford excellent gas-solid contact and are especially adaptable to handling large gas streams and large amounts of solid materials. I have found that if the water content of the gas stream exceeds about 8000 p.p.m., the effectiveness of fluidized bed reactions rapidly decreases, apparently due to tackiness of the sodium carbonate that prevents good fluidization of the solid particles. Higher concentraions of water vapor, suitably up to about 10,000 p.p.m., can be used without detriment in fixed beds.

The full benefit of incorporating water vapor in the waste gas stream is not obtained if at any time during the reaction life of the sodium carbonate it is contacted with a dry waste gas stream. The slight reaction of sodium carbonate with a dry gas apparently conditions the surface to inhibit further reaction.

The activity of a partially reacted sodium carbonate bed can be reinstated by grinding, for example by ball-milling, apparently due to regeneration of a reactive surface. In a preferred method for treating plant waste gases, the conditioned waste gas stream is contacted with a fluid bed of sodium carbonate until a predetermined amount of $NO_2$ is passed by the reactor, suitably 700 p.p.m. $NO_2$. At such times the waste gas stream is directed to a second reactor and the sodium carbonate from the first reactor is removed, ground and returned to the first reactor. At such time as the second reactor effluent reaches the predetermined $NO_2$ concentration, the waste gas stream is directed back to the first reactor. Several reactors may be used to accommodate different time cycles that may be required with various equipment type and design.

The sodium nitrate and sodium nitrite produced by the reaction, valuable as a fertilizer and for other industrial uses, can be separated from any unreacted sodium carbonate by fractional crystallization.

Although the foregoing description has been directed primarily to the reaction of sodium carbonate, similar results are obtained using calcium oxide or calcium carbonate. For example, when a 0.5 c.f.m. room temperature stream of nitrogen containing 2048 p.p.m. of $NO_2$ was passed through 275 g. of finely divided calcium oxide in the above described fluidized bed reactor, there was an initial reaction of about one-half hour duration during which substantially all the $NO_2$ was removed, after which only about the half the $NO_2$ was removed from the gas stream. When 2000–10,000 p.p.m. of water vapor was then added to the gas stream, the $NO_2$ absorption became substantially complete and was still substantially complete after ten hours of operation. Higher water content, e.g., 25,000 p.p.m. water, can be used with CaO without adversely affecting the physical nature of the bed.

In another example, an 0.5 c.f.m. room temperature stream containing 2048 p.p.m. $NO_2$ was passed through finely divided calcium carbonate (native chalk). After a very short initial reaction, there was no absorption of $NO_2$, but when 3000–10,000 p.p.m. of water vapor were then added to the gas stream 79 to 80% of the $NO_2$ was absorbed during 90 minutes of operation.

Sodium carbonate monohydrate may be used as well as sodium carbonate, the anhydrous being preferred as it is somewhat more reactive.

The solid reactant is preferably finely divided, the most desirable degree of subdivision depending on the type of gas-solid contact to be used. In fluidized beds the particle size suitably is between about 40 and 80 mesh.

Although the foregoing description has been directed to the removal of $NO_2$ from industrial waste gases, it should be recognized that the reaction is suitable for removing nitrogen oxides from automative exhausts as well. Since NO is the primary nitrogen oxide present in internal combustion engine exhaust, it is necessary to oxidize it to $NO_2$ before passing the exhaust through the solid absorbent bed. In such cases, air is mixed with the exhaust, in any of the well-known conventional methods, whereby the NO is rapidly oxidized to $NO_2$, and the exhaust is then discharged through a bed of sodium carbonate, calcium carbonate or calcium oxide.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. A method of removing nitrogen dioxide from waste gas containing low concentrations of nitrogen dioxide comprising maintaining the water vapor content of said gas between about 250 and 8,000 p.p.m. and the temperature of said gas between about ambient temperature and 200° C., and contacting said gas with a bed of finely divided solid sodium carbonate fluidized on a stream of said gas.

2. A method according to claim 1 in which the temperature is below about 120° C.

3. A method according to claim 1 in which said waste gas contains less than about 10,000 p.p.m. $NO_2$.

4. A method according to claim 1 in which the absorbent is periodically removed from contact with said gas, ground, and recontacted with said gas.

References Cited

UNITED STATES PATENTS

| | | | |
|---|---|---|---|
| 910,530 | 3/1908 | Halvorsen | 23—161 |
| 1,032,782 | 7/1912 | Schonherr et al. | 23—161 |
| 1,716,479 | 7/1929 | Bilsky | 23—2X |
| 2,611,680 | 9/1952 | Ruth | 23—2 |

OSCAR R. VERTIZ, Primary Examiner

E. C. THOMAS, Assistant Examiner

U.S. Cl. X.R.

23—161